United States Patent
Lackmann et al.

(10) Patent No.: US 8,508,829 B2
(45) Date of Patent: Aug. 13, 2013

(54) VEHICLE INDICATION SYSTEM HAVING AN OPTICAL SYSTEM, HAVING A FIRST INDICATION DEVICE AND HAVING A SECOND INDICATION DEVICE

(75) Inventors: Kay Lackmann, Essen (DE); Frank Schliep, Leverkusen (DE)

(73) Assignee: Johnson Controls GmbH, Burscheid (DE)

( * ) Notice: Subject to any disclaimer, the term of this patent is extended or adjusted under 35 U.S.C. 154(b) by 227 days.

(21) Appl. No.: 12/742,087

(22) PCT Filed: Nov. 10, 2008

(86) PCT No.: PCT/EP2008/009478
§ 371 (c)(1),
(2), (4) Date: Sep. 13, 2010

(87) PCT Pub. No.: WO2009/059799
PCT Pub. Date: May 14, 2009

(65) Prior Publication Data
US 2011/0007378 A1   Jan. 13, 2011

(30) Foreign Application Priority Data
Nov. 8, 2007 (DE) .......................... 10 2007 053 624

(51) Int. Cl.
G02F 1/153 (2006.01)
(52) U.S. Cl.
USPC .......................................................... 359/267
(58) Field of Classification Search
USPC .................................................. 359/265–275
See application file for complete search history.

(56) References Cited

U.S. PATENT DOCUMENTS
7,274,501 B2 * 9/2007 McCabe et al. ............... 359/265
2002/0154349 A1 10/2002 Halldorsson et al.

FOREIGN PATENT DOCUMENTS
| DE | 43 23 082 A1 | 1/1995 |
| EP | 1 052 133 A2 | 11/2000 |
| JP | 2001-333351 | 11/2001 |
| JP | 2004-271830 | 9/2004 |
| JP | 63-232042 | 9/2009 |
| WO | WO 2005/098513 A1 | 10/2005 |

OTHER PUBLICATIONS

International Preliminary Report on Patentability mailed Jun. 10, 2010 in PCT/EP2008/009478.

(Continued)

*Primary Examiner* — Tuyen Tra
(74) *Attorney, Agent, or Firm* — Foley & Lardner LLP

(57) ABSTRACT

A vehicle indication system is proposed having an optical system (1), having a first indication device (2) and having a second indication device (3), wherein the optical system is intended to indicate information, which is provided by the first indication device, in an at least partially transparent or translucent form, wherein the optical system is intended to indicate information, which is provided by the second indication device, in an at least partially reflective form, wherein the optical system has a first area (6), the light transmission coefficient and light reflection coefficient of which are variable, and wherein the optical system has a second area (4), the light reflection coefficient of which is provided in a reduced form by means of a non-reflective layer.

4 Claims, 1 Drawing Sheet

(56) References Cited

OTHER PUBLICATIONS

Figure 1:
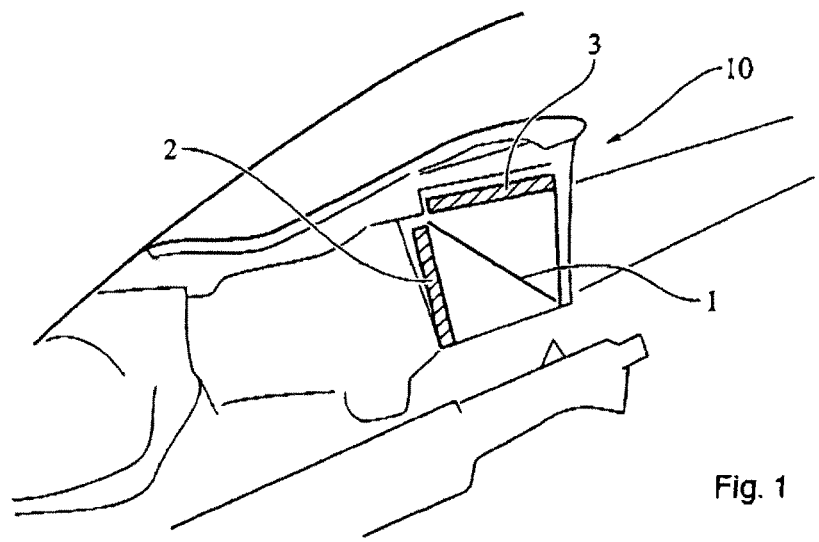

International Search Report received in corresponding International Application No. PCT/EP2008/009478.
China First Office Action dated Aug. 17, 2012 as received in corresponding China Application No. 200880119816.9.
English Translation of Japanese Examination Report received in connection with Japanese application No. JP 2010-532501; dtd Feb. 5, 2013
Japanese Examination Report received in connection with Japanese application No. JP 2010-532501; dtd Feb. 5, 2013.

* cited by examiner

VEHICLE INDICATION SYSTEM HAVING AN OPTICAL SYSTEM, HAVING A FIRST INDICATION DEVICE AND HAVING A SECOND INDICATION DEVICE

CROSS-REFERENCE TO RELATED APPLICATIONS

This application is a National Stage application of PCT/EP2008/009478, filed Nov. 10, 2008, which claims the priority of German Patent Application No. 10 2007 053 624.2, filed Nov. 8, 2007. The foregoing applications are incorporated by reference herein in their entirety.

The present invention relates to an optical element that is designed to be switchable between at least two states, the optical element being fashioned to be largely transmitting in a first state and designed to be largely reflecting in a second state. A preferred use of such an optical element or such a switch consists in their use as a component of a hybrid motor vehicle display instrument that is switchable between two optical paths, the motor vehicle display instrument or vehicle display system having an optical system, a first display device and a second display device.

A vehicle display system of the generic type is disclosed in German patent application DE 10 2007 014 581 A1.

It is an object of the present invention to provide a vehicle display system in the case of which it is possible to combine a design of the vehicle display system that is simple and safe to operate as well as being reliable with a high level of variability in display options.

The object is achieved by a vehicle display system having an optical system, having a first display device and having a second display device and in the case of which vehicle display system the optical system is provided in an at least partially transparent or translucent fashion for the purpose of displaying information provided by the first display device, the optical system being provided at least partially in a reflecting fashion for the purpose of displaying information provided by the second display device, the optical system having a first region whose light transmission and light reflection coefficient is variable, and the optical system having a second region whose light reflection coefficient is provided in a fashion reduced by means of an antireflection layer.

It is hereby advantageously possible according to the invention that harmful reflections—in particular those that lead to so-called ghost images—are effectively avoided or at least substantially reduced in favor of comfort in using the vehicle display system and in favor of safety during operation of the vehicle display system.

Furthermore, it is preferred according to the invention that the optical system has a transparent element, in particular a glass element, between the first region and the second region.

It is hereby advantageously possible according to the invention to design the vehicle display system in a simple and yet stable fashion that is particularly robust with regard to operating the vehicle display system over an operating time of many years.

Furthermore, it is particularly preferred according to the invention that the optical system is of substantially flat or planar design.

It is possible hereby in a particularly advantageous way in accordance with the present invention to have a particularly simple design of the vehicle display system that is stable—particularly with regard to a comparatively long operating time.

Furthermore, it is preferred according to the invention that the first display device is provided as an analog display device, and that the second display device is provided as a digital display device.

It is hereby advantageously possible according to the invention to display a multiplicity of different items of information for a user in a particularly space-saving way. Furthermore, the operating safety of a vehicle equipped with the inventive vehicle display system is also hereby increased so that the driver need not avert his direction of view from the direction of view provided for observing the events on the road in order to have a specific item of information displayed, or at least need do so less intently.

It is, furthermore, also preferred according to the invention that the optical system has an electrochromic region in the first region.

It is hereby advantageously possible according to the invention to switch over actively between the two display devices with the aid of simple means.

Furthermore, it is also preferred according to the invention that the optical system has the electrochromic first region between a further layer, as support layer, and a layer made respectively from a glass material.

It is hereby possible according to the invention in a particularly advantageous way to implement a vehicle display system that can be produced cost-effectively and has a high level of stability.

Figure 2:
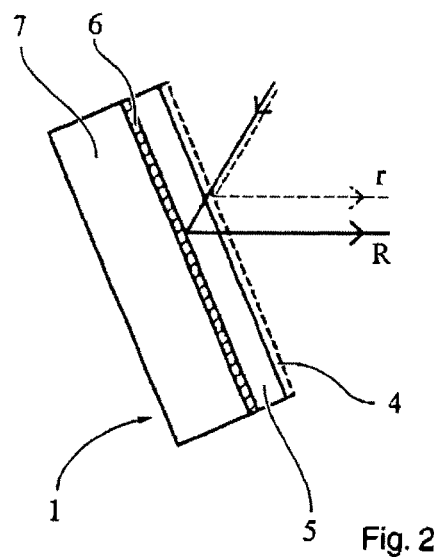

The invention is explained in more detail below with reference to exemplary embodiments illustrated in the drawing, in which:

FIG. 1 shows a schematic sectional illustration of an inventive vehicle display system, and FIG. 2 shows a schematic sectional illustration of an optical element or optical system of a vehicle display system in accordance with the present invention.

FIGS. 1 and 2 illustrate an exemplary embodiment of an inventive vehicle display system 10 and, respectively, an optical element or optical system of the inventive vehicle display system 10.

It emerges from FIG. 1 in particular, that the vehicle display system 10 has a first display device 2 and a second display device 3. It is provided here, in particular, that the first display device 2 has, for example, an analog display option, particularly an analog pointer—particularly a mechanically rotatable one, and that the second display device 3 has, for example a digital display option—for example in the form of a matrix display element—for example in the form of a liquid crystal display element or else an OLED display element (organic light-emitting diode display) or the like. However, it is also possible to provide according to the invention that, in addition, the first display device 2 has a digital display—at least in a subregion—and/or that the second display device 3 has an analog display element—at least in a subregion.

According to the invention, the vehicle display system 10 further has an optical system 1 that is designed in the exemplary embodiment illustrated in the figures essentially as a mirror that can be actively driven and is semitransparent or totally transparent in at least one operating mode. The optical system 1 is illustrated schematically in an illustration of a detail in FIG. 2. The optical system 1 is also denoted below as an optical switch 1 or as a switch 1. Furthermore, the first display device 2 and the second display device 3 are also denoted below as imagers 2, 3 or as image sources 2, 3.

In accordance with the exemplary embodiment according to FIG. 1, the switch 1 is arranged in an approximately angularly bisecting fashion between the angle defined by two imagers 2, 3. The state of the optical element 1 or optical system 1 therefore influences which of the image sources 2, 3 (or which of the first display device 2 or the second display device 3) the user (not illustrated in the drawing, but to be imagined as on the right-hand side) predominantly or exclusively perceives.

It is preferred according to the invention to provide that the surface (also subsequently denoted as second region 4 of the optical system 1) of the optical element be equipped with an antireflection layer 4. This largely suppresses an interfering reflection at the first surface, facing the viewer, of a layer 5, which can consist of glass, for example.

In addition, an undesired reflection takes place at the interface between the layer 5 and an adjacent layer 6 of variable transmission (subsequently also denoted as first region 6 of the optical system 1). In the case when this layer 6 is brought into a state of low transmission—such a controllable darkening can, however, be effected by an electrochromic layer—the visibility of the imager 2 (or the first display device 2) for the user is reduced or suppressed, resulting in a visibility of the imager 3 (or the second display device 3) that is caused by reflection. This state is therefore accompanied by an increased light reflection coefficient in the first region 6 of the optical system 1 and by a reduced light transmission coefficient. In another switching state of the first region 6 of the optical system 1, it can conversely be provided that a reduced light reflection coefficient in the first region 6 of the optical system 1 is accompanied by an increased light transmission coefficient such that the visibility of the imager 3 (or the second display device 3) for the user is reduced or suppressed, and a visibility of the imager 2 (or the first display device 2) caused by transmission results.

It holds in general that the intensity with which the imagers 2, 3 generate their images for perception by the user can be influenced by the illuminance of light sources assigned to them (but not illustrated in the drawing); it is thereby also possible to generate a mixed image combined from two optical paths.

Adjoining the layer 6 of variable transmission, a further layer 7 which serves chiefly as a support and ensures the mechanical stability of the switch 1 or the optical system 1; this can be a glass plate or a comparably transparent component.

The outlined design of the optical element 1 or the optical system 1 thus specifies an apparatus that substantially reflects at a plane (see the bold line R); according to the invention, the formation of so-called ghost images such as occur in the case of double reflection (illustrated by dashes in the figure and denoted by r) is thereby counteracted.

The antireflection layer 4 is provided, in particular, in the form of a multilayer structure made from materials of different refractive index such that light in a wavelength region chiefly relevant to the use of the vehicle display system is precisely not reflected in another region than the first region 6 of the optical system 1.

According to the invention, the optical system 1 is particularly substantially of flat or planar design such that production is possible in a comparatively simple and cost-effective way. As an alternative to such a design, it is, however, also possible according to the invention for the optical system 1 to have at least one curved surface, or else to have one curved (internal) face such that it is possible, for example, to implement an imaging property of the optical system.

LIST OF REFERENCE SYMBOLS

1 Optical system/optical element/switch
2 First display device
3 Second display device
4 Second region of the optical system/antireflection layer
5 Layer
6 First region of the optical system/variable transmission layer
7 Further layer
10 Vehicle display system
R Reflection at the variable transmission layer
r Reflection at the surface of the layer 5 facing the user

The invention claimed is:

1. A vehicle display system comprising:
    a first display device;
    a second display device; and
    an optical system configured to switch from being at least partially transparent or translucent to display information provided by the first display device to being at least partially reflective to display information provided by the second display device,
    wherein the optical system includes:
        an electrochromic first region including a light transmission and a light reflection coefficient that are changeable, wherein the electrochromic first region switches the optical system from being at least partially transparent or translucent to at least partially reflective,
        a second region including a light reflection coefficient reduced by an antireflection layer; and
        wherein the electrochromic first region is between a further layer that serves as a support layer and a layer, each of the further layer and the layer comprising a glass material.

2. The vehicle display system as claimed in claim 1, wherein the optical system is substantially one of flat and planar design.

3. The vehicle display system as claimed in claim 1, wherein the first display device is an analog display device, and wherein the second display device is a digital display device.

4. The vehicle display system as claimed in claim 1, wherein the electrochromic first region is directly between the further layer that serves as the support layer and the layer.

* * * * *